United States Patent [19]
Louviere, III

[11] Patent Number: 5,775,255
[45] Date of Patent: Jul. 7, 1998

[54] ANT RETREAT DISH

[76] Inventor: Dennis Louviere, III, 1018 Cajun Dr., New Iberia, La. 70560

[21] Appl. No.: 690,758

[22] Filed: Aug. 1, 1996

[51] Int. Cl.⁶ .............................. A01K 5/01; A01K 7/00
[52] U.S. Cl. .............................. 119/51.5; 119/61
[58] Field of Search .............................. 119/51.5, 61, 59, 119/63

[56] References Cited

U.S. PATENT DOCUMENTS

| | | | |
|---|---|---|---|
| 2,191,811 | 2/1940 | Trampier, Sr. | 119/51.5 |
| 2,677,350 | 5/1954 | Prestidge et al. | 119/61 |
| 4,357,905 | 11/1982 | Carpenter | 119/51.5 |
| 4,803,954 | 2/1989 | Welch et al. | 119/61 |
| 5,005,524 | 4/1991 | Berry | 119/61 |
| 5,031,575 | 7/1991 | Phillips | 119/61 |
| 5,113,798 | 5/1992 | Rera | 119/61 |
| 5,245,948 | 9/1993 | McClellan | 119/51.5 |
| 5,253,609 | 10/1993 | Partelow et al. | 119/61 |
| 5,277,149 | 1/1994 | East | 119/51.5 |
| 5,526,773 | 6/1996 | Richardson | 119/51.5 |
| 5,564,363 | 10/1996 | Soffici | 119/61 |
| 5,577,461 | 11/1996 | Sebastian et al. | 119/51.5 |

*Primary Examiner*—John J. Wilson
*Assistant Examiner*—Yvonne R. Abbott
*Attorney, Agent, or Firm*—Patent & Trademark Services; Joseph H. McGlynn

[57] ABSTRACT

A pet feeding dish with at least two feeding compartments, each feeding compartment being separated by a wide rim portion, and each feeding compartment being surrounded by a concave outer moat that may be filled with liquid to act as a barrier against crawling insects such as ants from infiltrating the pet food. The moat is provided with a drain hole at the bottom and a drain plug easily removable from the underside of the feeding dish to allow for draining of the liquid from the moat.

10 Claims, 1 Drawing Sheet

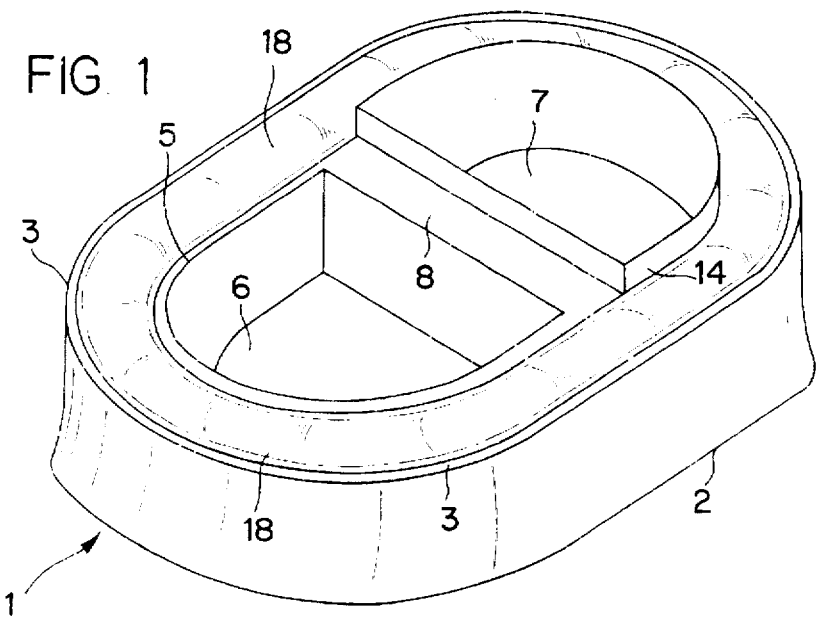
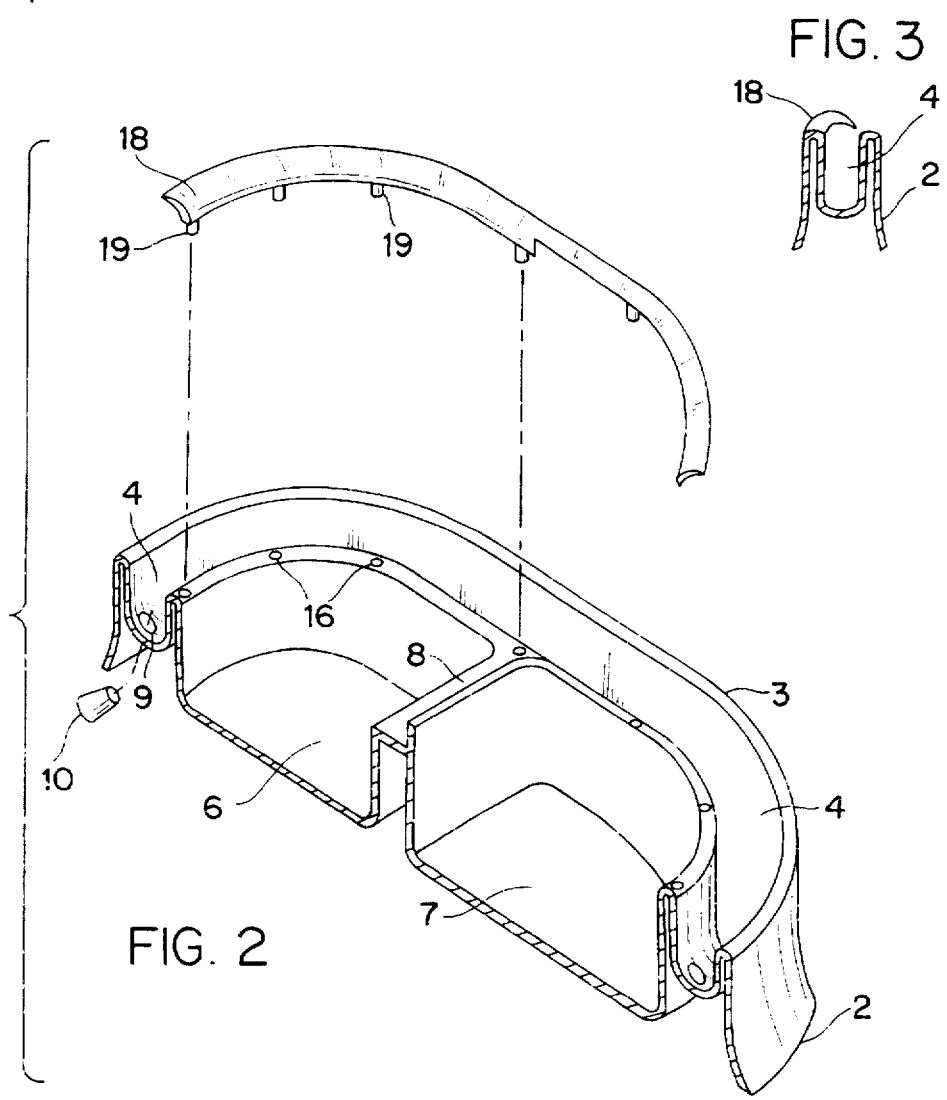

ANT RETREAT DISH

BACKGROUND OF THE INVENTION

This invention relates, in general, to a feeding dish for pets, in particular, to a feeding dish for pets with a moat around the perimeter of the bowl to trap ants or other small crawling insects before they are able to infiltrate the food in the feeding dish.

The instant invention is an improvement over the pet feeding dishes of the prior art. The Ant Retreat Dish is substantially oval in shape with a large central portion divided into two compartments, one compartment of which may be used for dry pet food and the other compartment used for pet food which includes a liquid. Leaving a pet feeding dish with pet food in it for any length of time, particularly outdoors, is an attraction to crawling insects of all types, but particularly to ants. For this reason, a moat is provided surrounds both feeding compartments of the pet feeding dish which may be filled with water to "trap" ants and other intrusive crawling insects. Further, a drain plug is located in the bottom of the moat for ease of removing the water from the moat.

DESCRIPTION OF THE PRIOR ART

U.S. Pat. No. 5,113,798 illustrates a round animal feeding dish with a single compartment for pet food, and a moat surround the outer perimeter of the feeding dish.

U.S. Pat. No. 5,245,948 discloses an animal feeding dish of circular configuration with a central feeding compartment, a moat around the outer perimeter of the feeding dish, and a separate circular watering compartment to fill the moat.

U.S. Pat. No. 5,253,609 shows a pet feeding dish removably mounted on a pedestal, the base of which is a circular moat that may be filled with water and the pedestal of the pet feeding dish pushed down upon an upwardly extending spike.

U.S. Pat. No. 5,277,149 is an oval pet dish having a protrusion in the base onto which a post is force fitted, the post supporting a removable pet feeding container with a fitted storage cover. The oval base of the pet dish may be filled with water to act as a moat against crawling insects.

SUMMARY OF THE INVENTION

The Ant Retreat Dish is an improvement over the prior art for several reasons.

Firstly, there is nothing in the prior art to show a multiple compartment feeding dish for pets that includes a moat surrounding each of the compartments of the feeding dish.

Secondly, along the bottom of the continuous moat which surrounds each compartment of the feeding dish is provided a drain plug for ease of removing the liquid from the moat.

The Ant Retreat dish consists of a substantially oval shaped dish with a concave divided feeding compartment in the center thereof to receive either food or liquid, the multi-compartmented section being fully surrounded by a U-shaped shallow moat into which is placed a liquid. The food compartment is raised higher than the water compartment so food will not be spilled into the pet's water. The liquid in the outer moat acts as a barrier to prevent crawling insects such as ants from infiltrating the feeding compartments. The moat has a partial cover so the animal can not drink the water in the moat. The central feeding compartments are separated by a vertical wall, the feeding compartments being deeper than the outer moat so as to allow for a quantity of food to be placed in the compartments. A lip at the top outer edge of the feeding compartments separates the feeding compartments from the moat. The outer wall of the feeding dish curves downward from a lip at the top of the moat to flare outward to the floor for stability of the dish when placed on a horizontal surface.

In use, a pet owner would place wet or dry food in one compartment of the feeding dish, and add another type of food or liquid to the other compartment. The moat would then be filled with liquid to act as a barrier to trap crawling insects and prevent them from infiltrating either of the feeding compartments.

The moat is provided with a drainage hole into which a resilient plug is force fitted from the underside of the feeding dish. The Ant Retreat Dish is easily cleaned by pulling the drain plug in the bottom of the moat, allowing the water to flow out, and the dish may then be properly cleaned before refilling.

The Ant Retreat Dish would be best manufactured of tough, durable ABS plastic. This plastic molding process utilizes heat softened plastic material which is forced under very high pressure into a metal cavity mold which is relatively cool. The inside cavity mold is comprised of two or more halves and is the same desired shape as the distributor product to be formed. High pressure hydraulics are used to keep the mold components together during the actual injection phase of the molding process. The injected plastic is allowed to cool and harden. The hydraulics holding the multiple component cavity together are released, the halves of the mold separated and the solid formed plastic item is removed. This process can easily be automated and is capable of producing extremely detailed parts at a very cost effective price. I have chosen ABS plastic over PVC (polyvinyl chloride) since PVC plastic produces acids and gases which will degrade the injection mold cavity over time. ABS plastic is solvent adhesive compatible with the PVC pipe, and will not cause damage to the injection mold cavity.

BRIEF DESCRIPTION OF THE DRAWINGS

FIG. 1 is a full view of the Ant Retreat Dish which clearly shows the two feeding compartments, the moat surrounding both feeding compartments, and the position of the drain plug at the bottom of the moat.

FIG. 2 is a cutaway view of the Ant Retreat Dish showing the drain plug as it is removed from the bottom of the moat to allow water to flow out of the moat.

FIG. 3 is a partial view showing the cover on the dish.

DESCRIPTION OF THE PREFERRED EMBODIMENTS

In FIG. 1, there is shown a full view of the substantially oval shaped Ant Retreat Dish 1, the lower edge 2 being slightly flared outward for stability to prevent the Ant Retreat Dish 1 from being tipped over easily. At the topmost portion of the side 2 is a narrow rim portion 3, a moat 4 extending downward in an arcing manner from the narrow rim portion 3 and rising upward to a second narrow rim portion 5. The two feeding/water compartments 6 and 7, into which pet feed may be placed, extend downward from narrow rim portion 5. The food dish 7 is made by means of a higher side wall 14 higher than the water dish 6 so the pet is not as likely to spill food into the water dish as it is feeding. Also, the food dish 7 can be made as a removable dish so it will be easier to clean. A wide divider portion 8 separates the two feeding/water compartments 6 and 7, which allows for both a dry and a wet pet food or water to be placed separately in the Ant Retreat Dish 1.

In use, the moat 4 would be filled with water to act as a barrier from crawling insects, such as ants, to prevent them from infiltrating the two feeding/water compartments 6 and 7. A drain hole 9 (see FIG. 2) is provided for draining water from the moat 4, without disturbing the food/water in the compartments 6, 7.

FIG. 2 is a cutaway view showing the Ant Retreat Dish 1 with the stopper 10 removed from the drain 9 of the moat 4 which surrounds both feeding compartments. In addition a partial cover 18 can be provided over the moat. The cover could have projections 19 on the underside which would make a friction fit with apertures 16 to secure the cover in place. The cover should be wide enough to prevent the pet from drinking the water in the moat 4, which may contain insects, but narrow enough so insects could not cross from the rim 3 to the cover 18.

The present invention can be made using an injection molding process. Injection molding is a plastic molding procedure whereby heat softened plastic material is forced under very high pressure into a metal cavity mold which is relatively cool. Acceptable metals for the mold are aluminum and steel. The inside cavity of the mold is comprised of two or more halves, and is the same desired shape as the product to be formed. High pressure hydraulics are used to keep the mold components together during the actual injection phase of the molding process. The injected plastic is allowed to cool and harden. The hydraulics holding the multiple component cavity together are released, the halves of the mold are separated and the solid formed plastic item is removed. Injection molding can be a highly automated process and is capable of producing extremely detailed parts at a very cost effective price.

Although the Ant Retreat Dish and the method of using the same according to the present invention has been described in the foregoing specification with considerable detail, it is to be understood that modifications may be made to the invention which do not exceed the scope of the appended claims and modified forms of the present invention by others skilled in the art to which the invention pertains will be considered infringements of this invention when those modified forms fall within the claimed scope of this invention.

What I claim as my invention is:

1. An ant retreat dish comprising:

a housing having a bottom, sides, and an open top, means for dividing said open top into multiple compartments, means surrounding said multiple compartments for protecting said multiple compartments from infiltration by crawling insects means for providing stability to said housing when said housing is placed on a horizontal surface, and wherein said means surrounding said multiple compartments is provided with cover means for partially covering said surrounding means to prevent an animal from drinking liquid therein, and wherein said cover means has projections on a bottom portion thereof, and said housing has apertures for receiving said projections, whereby said cover can be removably mounted on said housing.

2. The ant retreat dish of claim 1 wherein each of said multiple compartments consist of a horizontal bottom portion and substantially vertical side portions.

3. The ant retreat dish of claim 1, wherein said means for dividing said housing into multiple compartments is a vertical wall which extends from said bottom portion of said multiple compartments to a top of said multiple compartments.

4. The ant retreat dish of claim 1, wherein said means for protecting said multiple compartments from infiltration by insects is an outer compartment which surrounds said multiple compartments, said outer compartment having a vertical wall extending downward from a rim portion which is even with said top of said multiple compartments, said outer compartment holding a predetermined amount of liquid.

5. The ant retreat dish of claim 4, wherein said outer compartment has means for removing said liquid without disturbing contents in said multiple compartments.

6. The ant retreat dish of claim 4, wherein said means for providing stability to said housing when placed on a horizontal surface is a vertical wall extending downward from said outer compartment, said vertical wall being wider at the bottom than at the top thereof.

7. The ant retreat dish as defined in claim 1, wherein said housing is manufactured of plastic.

8. The ant retreat dish as defined in claim 5, wherein said means for removing said liquid without disturbing contents in said multiple compartments is a drain hole, said drain hole having a plug inserted into said drain hole, said plug being slightly tapered for a snug fit within said drain hole, whereby said plug can be removable for draining said liquid from said outer compartment, and easily replaceable when said outer compartment is to be filled with liquid.

9. The ant retreat dish as defined in claim 1 wherein one of said multiple compartments is higher than another of said multiple compartments.

10. The ant retreat dish as defined in claim 9, wherein said higher multiple compartment is removable from said housing.

\* \* \* \* \*